Figure 1:
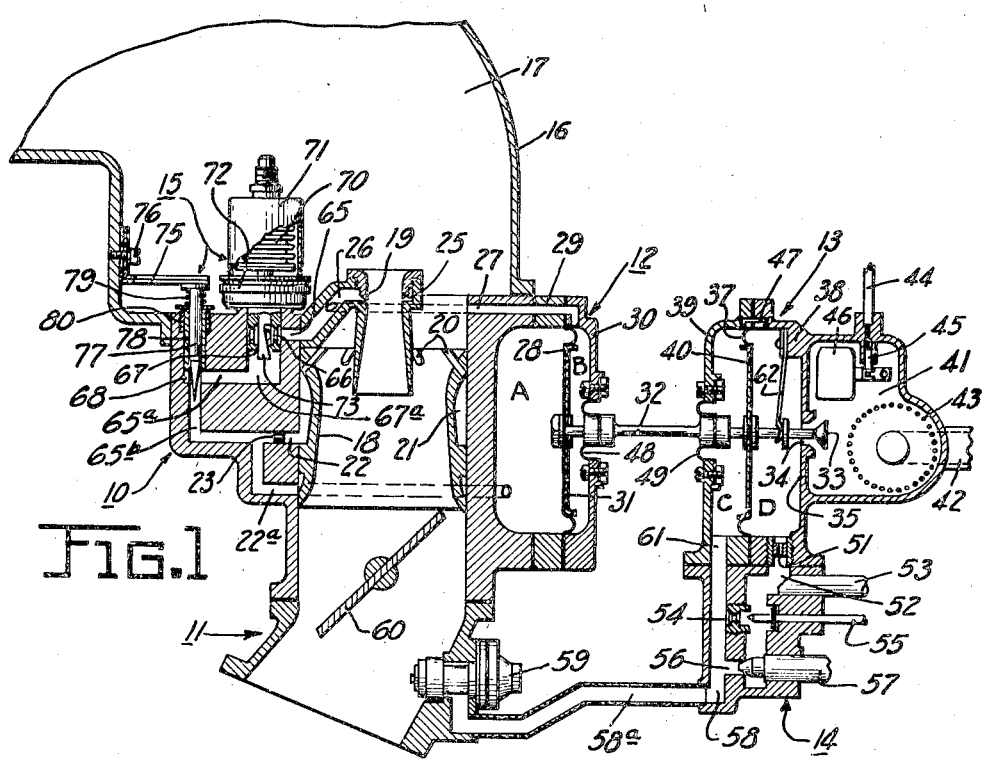

Dec. 28, 1948.  F. C. MOCK  2,457,171
CHARGE FORMING DEVICE
Filed April 22, 1944  2 Sheets-Sheet 1

INVENTOR
FRANK C. MOCK
BY
ATTORNEY

Patented Dec. 28, 1948

2,457,171

UNITED STATES PATENT OFFICE 2,457,171

CHARGE FORMING DEVICE

Frank C. Mock, South Bend, Ind., assignor to Bendix Aviation Corporation, South Bend, Ind., a corporation of Delaware Application April 22, 1944, Serial No. 532,261

5 Claims. (Cl. 261—39)

This invention relates to charge-forming devices or carburetors for aircraft power units, and is particularly concerned with an improved automatic density and fuel-mixture control for such carburetors.

As is well known, density is a function of pressure and temperature, and changes in density may result from changes in the pressure component of the ambient air, the temperature component or a combination of both components. Therefore, to correct or compensate exactly for changes in density, a control unit should operate in direct relation to pressure divided by temperature. However, it is not always desirable to compensate exactly in relation to pressure over temperature but to bias the control toward one or the other of said components. An example is in carburetors for aircraft internal combustion engines, where extremely high engine temperatures may require abnormal enrichment of the fuel mixture for cooling purposes. Again, some characteristic of the air intake system may require a biased correction. In the present invention, the control system includes pressure and temperature-responsive elements and a coacting system of air-metering passages wherein said elements are separately or independently mounted and either one may be changed or adjusted relatively to or without affecting the other, while at the same time the said elements operate in harmony to control said passages. This arrangement facilitates control in direct relation to changes in density at all altitudes or a biasing of the control toward the temperature component or the pressure component.

An object of the invention, therefore, is to provide a charge-forming device and coacting density control unit which may be arranged to compensate or correct the fuel-air mixture in direct relation to changes in density or to compensate to a greater or less extent for changes in density resulting from changes in the temperature component, viz., under or overcompensate for temperature.

Another object is to provide an improved charge-forming device or carburetor of the injection type having a fuel regulator automatically operated in accordance with mass air flow and wherein the fuel-air ratio of the fuel mixture may be selectively controlled in relation to changes in density.

Another object is to provide a density control system which is accurate in operation and at the same time may be readily adapted to various conditions.

A further object is to provide an automatic density control device having improved compensating characteristics.

Figure 1A:
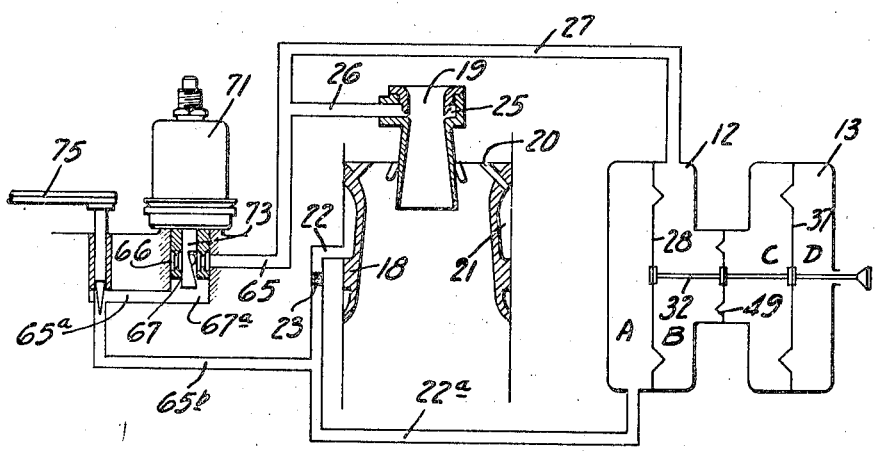
Figure 2:
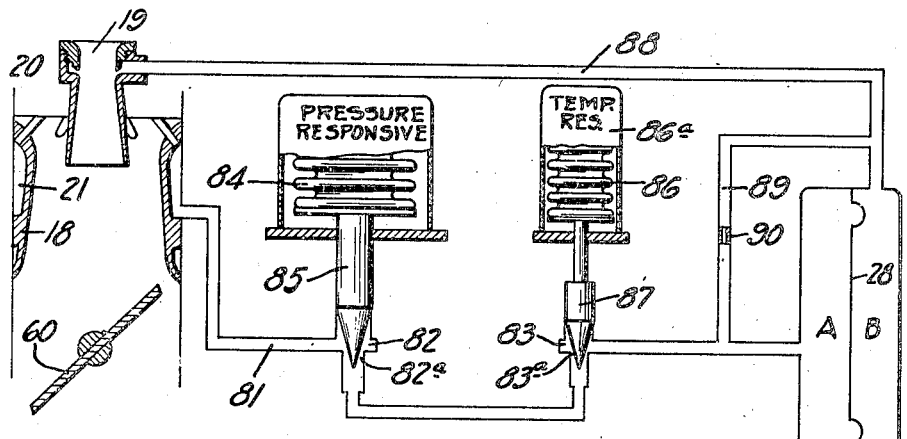

The foregoing and other objects and advantages will become apparent in view of the following description taken in conjunction with the drawings, wherein:

Figure 1 is a view in sectional diagram of an injection carburetor and coacting density control unit or system embodying one form of the invention;

Figure 1a, a diagram of the control system of Figure 1 apart from the remainder of the carburetor to facilitate an understanding of the system; and Figure 2, a view similar to Figure 1a of modified form of the control system.

First considering Figure 1, the carburetor or charge-forming device therein illustrated consists of a throttle body 10, an adapter 11, a regulator unit consisting of an air section generally indicated at 12 and a fuel section at 13, a fuel control unit at 14, and an automatic mixture control unit at 15.

The throttle body is adapted to be mounted at the discharge end of an air scoop 16 defining an air-intake passage 17, said body defining a carburetor inlet having a main venturi 18 and a small or boost venturi 19 receiving air from said passage. Scoop pressure is imposed on impact tubes 20 and is communicated through the latter to annular chamber 21 surrounding the main venturi 18 and thence by way of passage 22 having restriction 23 therein and a passage 22a to chamber A of the air section 12 of the regulator unit.

Venturi suction is registered in annular chamber 25 of the boost venturi and communicated to chamber B of the regulator unit through passage 26 and passage 27.

Chambers A and B are separated by flexible air diaphragm 28, which is securely anchored at its outer edge between annular body member 29 and end plate or cap 30 and is provided centrally with a thin, relatively rigid plate 31 to which is secured the head of a valve stem 32 provided with a valve member 33 adapted to coact with a port 34 formed in a partition 35 of the fuel section 13.

Chambers C and D of the fuel section 13 of the regulator are separated by a flexible diaphragm 37, which is securely anchored at its outer edge between casing 38 and end casing 39 and is provided centrally with a thin, relatively rigid plate 40 secured to valve stem 32.

The casing 38 defines a fuel chamber 41 to which fuel is supplied under pump pressure through pipe 42 and a strainer 43. A vapor vent pipe 44 is provided at the top of chamber 41 and is controlled by a needle valve 45 operated by float 46. Any air or vapor collecting in the top of chamber D may pass off therefrom to chamber C through bleed 47 and from the latter chamber pass out with metered fuel. The valve stem 32 is provided with sealing diaphragms 48 and 49 which at their outer edges are anchored in sealed relation to the end caps or plates 30 and 39, respectively. A master take-off jet 51 is located at the bottom of chamber D, and fuel flows from the latter chamber through this jet and port 52 to the fuel control unit, which as here shown is provided with idle valve 53, cruise metering jet 54 whose effective area may be varied by manual control valve 55, and port 56 controlled by economizer or power-enrichment valve 57, the latter being here shown only diagrammatically since in actual construction it is operated automatically through the differential in the pressures in chambers A and B and which differential is proportional to mass air flow.

Metered fuel from the metering orifices flows through passages 58, 58a to a nozzle unit 59 adapted to open under predetermined pressure (for example 5 pounds) and spray fuel into the air stream posterior to throttle 60. Metered fuel at nozzle pressure is also conducted to chamber C through passage 61.

An idle spring 62 in the upper part of chamber D is manually adjustable to exert a resilient force on the poppet valve 33 sufficient to hold the latter open when the engine is not running and give a slight enrichment to the mixture at extremely low air flow, as at idling.

Briefly, the regulator unit operates as follows:
The pressure differential between chambers A and B of the air section of the unit (which differential is a measure of mass air flow) produces a force to the right tending to open the fuel valve 33. This force may be termed the air-metering force. Fuel delivered under pump pressure through line 42, flows into unmetered fuel chamber D, thence through orifice 51' and port 52 into the fuel control body 14, and then through metering orifice 54 into passage 58 in communication with metered fuel chamber C, and then through passage 58a to nozzle 59. When the pressure rises above discharge pressure, or that set by nozzle 59, discharge through the latter begins. Any flow through the metering jets is accompanied by an increase in the differential pressure between chambers D and C, producing a force to the left tending to close fuel valve 33 and which may be termed the fuel metering force.

The air metering force controls the fuel metering force. Thus when the air metering force increases, valve 33 tends to open and increase the flow of fuel into chamber D, raising the pressure in the latter chamber which in turn causes an increase in the fuel supply and a rise in the fuel metering force to balance the increased air metering force; and when the air metering force decreases, valve 33 tends to close and decrease the supply of fuel into chamber D, whereupon the pressure drops in said chamber and the fuel supply is decreased accompanied by a drop in the fuel metering force.

For a more comprehensive description of the operation of injection carburetors of the general type with which the present invention is concerned, reference may be had to the copending application of Frank C. Mock, Serial No. 202,206, filed April 15, 1938, now patent No. 2,390,658 dated Dec. 11, 1945. In this connection it is to be understood that the regulator and fuel control sections are shown in simplified diagrammatic form in Figure 1, but may include any of the features of arrangement or construction shown in the said copending application Serial No. 202,206 or in copending application Serial No. 350,519 filed August 3, 1940, now Patent No. 2,361,227, dated October 24, 1944.

The present invention is concerned primarily with the mixture control unit 15 and coacting system for controlling the fuel-air ratio of the fuel mixture.

The passage 26 leading from the annular chamber 25 of the boost venturi is in pressure communication with passage 22a by means of passage 65, valve inlet ports 66, orifice 67 controlled by valve 73, chamber 67a, passage 65a, valve port 68 and passage 65b. The passage 65, 65a, 65b may be considered as a continuous passage which is controlled by a pressure-responsive unit and a temperature-responsive unit and coacting valves working in harmony yet capable of independent control. The pressure-responsive unit may be in the form of a bellows 70 connected at its upper end to a housing 71 which is anchored to the carburetor or deck by means of bushing 72 having a boss at its lower end threaded or otherwise engaged in the chamber 67a, the valve inlet ports 66 and the valve discharge orifice 67 being formed in said boss for variably communicating the passage 65 with the valve chamber 67a depending upon the position of tapered valve 73. To render the bellows 70 substantially free of temperature-responsiveness, it may be evacuated to a relatively high degree so as to be substantially devoid of air or any other temperature-responsive medium and spring-loaded to maintain it in a state of balance with respect to external pressures, the bellows being in a predetermined condition of collapse at ground level barometer. If properly correlated with its coacting temperature-responsive element, it may also have a certain amount of temperature response, as for example, by being gas-filled at any desired internal pressure at ground level, such as a pressure between 27" and 30" of mercury.

The lower or free end of the bellows carries the needle or air-metering valve 73 adapted to coact with the valve orifice 67 in controlling the passage 65. In the position shown, (the retracted position,) the needle valve 73 may be considered in a neutral or balanced position with respect to the passage 65, 65a, 65b, and the restriction 23, that is, any increase in flow capacity of said passage, as by a downward movement of the needle valve, will result in a decrease of pressure in chamber A and a corresponding decrease in the air metering force, whereby the quantity of fuel and hence the richness of the mixture is decreased. Upward movement of the valve, will result in an increase in pressure in chamber A, and therefore in a richening of the mixture.

A temperature-responsive element 75 is provided and at its one end is anchored to the wall of the scoop as by screw 76 projected through an elongated slot to permit vertical adjustment or positioning of the said element, the latter as here shown being formed of a bimetallic strip having its free end engaging a needle valve 77 mounted for reciprocatory movement in a bushing 78. A spring 79 encircles the upper extremity of the needle valve 77 and at its upper end abuts a cap or head formed on said latter valve and at its lower end abuts an adjustable sleeve 80 fitted into the deck portion of the carburetor body and by means of which sleeve the tension of the spring 79 may be adjusted to vary the responsive action of the said element. The needle valve 77 is adapted to control the passage of air through the orifice or port 68, and in the position shown (for example the position it will take at standard ground level temperature, or 61° F.) it may also be considered as in a neutral or balanced position with respect to the passage 65, 65a, 65b and restriction 23.

In operation, air is admitted to the engine in varying degrees, dependent upon the position of the throttle 60, through the passageway 17 and main venturi 18, a certain proportion of the air passing through the boost venturi 19. The pressure of the air impinging upon the impact tubes 20 is transmitted by way of passage 22, restriction 23 and passage 22a to chamber A, and registers scoop pressure in the latter chamber. Air passing through the boost venturi 19 sets up suction in the chamber 26 which is communicated to chamber B through passage 27; and the pressure differential between chambers A and B is a measure of air flow to the engine and when corrected for changes in density by the control unit 15 becomes a measure of mass air flow.

Let it be assumed that in the position of the needle valves 73 and 77 in Figures 1 and 1a, the orifices 67 and 68 are open to an extent such that the flow capacity of passage 65, 65a, 65b with respect to restriction 23 will produce a differential across diaphragm 28 corresponding to that which would result under standard ground level pressure and temperature conditions.

Should the density of the air decrease, as by a gain in altitude, the bellows 70 tends to extend itself due to a fall in external atmospheric pressure, and this projects the needle valve 73 and further opens orifice 67 and the passage 65, 65a, 65b. As a consequence, there is a pressure drop in passage 22a which in turn reduces the differential between chambers A and B, or across diaphragm 28, and the valve 33 tends to close and produce a leaner fuel mixture. Actually this tendency to produce a leaner mixture merely counteracts the tendency for the mixture richness to increase due to the increased Venturi suction for a given mass air flow upon decrease in density, and as a consequence the mixture richness remains constant with change in altitude.

Should the change in density result from or be accompanied by an increase in temperature, the needle valve 77 will be retracted from the orifice or port 68 and proportionally free the passage 65, 65b for flow of air therethrough, and should such change result from or be accompanied by a decrease in temperature, the said needle valve 77 will tend to restrict said port and proportionately restrict flow of air through said passage. As the passage indicated at 65, 65a, 65b becomes more and more restricted, the restriction 23 becomes less effective and the pressure in chamber A more closely approaches the pressure at impact tubes 20, and as said passage becomes more and more enlarged, said restriction becomes more effective and the pressure in chamber A is reduced relative to the pressure at the impact tubes 20.

It will be obvious that irrespective of whether or not the change in density results from a change in the pressure component, the temperature component or a change in both the pressure and temperature components, the control may be caused to regulate or compensate in direct relation to changes in density. However, there are instances when it may be desirable to produce a relatively rich or lean mixture with respect to temperature or pressure. Thus, a relatively rich mixture with an increase in temperature is ofttimes necessary to prevent overheating of the fuel charge and consequent detonation. By properly adjusting or correlating the action of the temperature-responsive element 75 with respect to the pressure-responsive element 70, the control may be caused to undercompensate for temperature and thus provide an increase in richness with increase in temperature.

This may be accomplished in the arrangement shown in Figures 1 and 1a in a number of different ways, as by contouring the active end of the needle valve 77 and its coacting port 68 in a manner such that increases in temperature cause the valve to progressively open passage 65, 65a, 65b at a rate less than normal so that the pressure in chamber A will be higher than for complete temperature compensation, whereby the mixture is richened. This result might also be attained by adjusting the vertical position of the element 75 and/or the tension of the spring 79; or by utilizing a temperature element having certain predetermined compensating characteristics with respect to the pressure element.

Again, it may be desired to undercompensate at certain temperatures and overcompensate at others, which may also be accomplished by properly contouring the active end of the needle valve 77 and its coacting port 68 in relation to the travel of the valve. For example, up to a temperature of 100° F., the valve could be contoured for less than normal restriction of passage 65a, 65b and for normal or greater than normal restriction of the passage at higher temperatures, which would result in undercompensation (a relatively lean mixture) over a predetermined lower temperature range, and a normal or somewhat richer than normal mixture through the higher temperature range.

This facility of adjustment results from the fact that, while the basic elements of the control work in harmony, they are not tied together.

Figure 2 illustrates a modified arrangement of the air passages and coacting pressure and temperature-responsive elements with respect to that shown in Figure 1. In this instance, the chamber A forming part of the air section of the regulator unit receives pressure from the impact tubes 20 and chamber 21 through a passage 81 having valve chambers 82 and 83 in series therein, said chambers being provided with flow orifices or ports 82a and 83a. A pressure-responsive element in the form of a spring-loaded partially-evacuated bellows 84 is provided and has a needle valve 85 at its free or extensible end adapted to coact with the valve chamber 82 and orifice or port 82a; and a temperature-responsive element in the form of a bellows 86 (which may be filled with a suitable liquid or other temperature-responsive medium) is provided and has a needle valve 87 connected to the extensible end thereof, said valve coacting with the valve chamber 83 and orifice or port 83a. The bellows 86 may be mounted in a housing or shield 86a provided with heat conducting fins or like members to expedite a temperature response.

Venturi suction is applied to the chamber B through passage 88. A passage 89 having a restriction or bleed 90 therein communicates the passage 81 beyond the temperature-responsive unit with the passage 88.

In operation, at standard ground level barometric conditions, the orifices 82a, 83a are open to a point of minimum effect of bleed 90, the needle valve 85 being then in retracted position, and the needle valve 87 in the neighborhood of its intermediate position. Since the bleed 90 has at this time minimum effect to passage air from the passage 81 to the passage 88, the differential pressure across the diaphragm 28 will be relatively high to provide an air-metering force in conformity with average ground level density. Should there be a change in density due to a change in pressure without a change in temperature, the bellows 84 will become extended and the needle valve 85 will move downwardly into the port 82a and correspondingly restrict passage 81. As this passage becomes more and more restricted, the bleed 90 becomes more effective in reducing the pressure in chamber A and as a consequence the differential pressure across the diaphragm 28 will be gradually reduced to maintain the proper fuel-air ratio. Should the change in density result from a change in temperature, the bellows 85 will be actuated to thereby actuate the needle valve 86 in direct relation to the temperature change. If the temperature is increased, the bellows 86 expands and the needle valve 87 is lowered in the orifice or port 83a, and should the temperature decrease, bellows 86 will contract and cause the valve 87 to progressively open or enlarge said orifice. At ground level the orifice or port 82a has a relatively large opening, and any unit change in temperature and consequently the area of orifice 83a will have a larger total effect than at altitude when the port 82a is more nearly closed. This characteristic tends towards correct density compensation. In this instance also, the temperature and pressure-responsive units are independently mounted and may be adjusted independently or substituted by elements having characteristics capable of producing a selected response. Thus, the valve 86 may be caused to undercompensate or overcompensate for temperature by having its contour and/or travel regulated to vary the area of orifice 83a in proper relation to variation of flow through the orifice 82a.

In each form of the invention illustrated, the arrangement of the flow passages and coacting control elements is such as to provide accurate density compensation and preselected biased compensation. From a practical standpoint, independent mounting and adjustment has many advantages. Thus, the pressure and temperature elements may be located at points where a more accurate overall response results, or to conform to different installation requirements, the location of one not necessarily governing the location of the other; errors may be easily checked and corrected, and in general the control is more flexible than where the pressure and temperature elements are structurally interdependent.

In the foregoing description of the several modifications of the invention, it has been assumed that the pressure-responsive capsule was either devoid of temperature compensation or of insufficient temperature compensation. By increasing the gas content of the sealed pressure-responsive capsule, its temperature responsiveness may in itself be too great. In such case the separate temperature-responsive element is to be arranged to operate in a direction opposite from that described for a given temperature change. For example, if the capsule 70 of Figure 1 expands excessively in response to an increase in temperature, the temperature-responsive valve 77 will be arranged to move downwardly (instead of upwardly as previously explained) to thereby reduce the effective flow capacity of the passage 65, 65a and 65b to thereby correct for the overtemperature compensation of the capsule 70.

Obviously, the system of air passages and flow orifices together with the particular arrangement of pressure and temperature-responsive elements as herein disclosed may be modified and rearranged within certain limits without departing from the scope of the invention as defined by the appended claims.

I claim:

1. In a device for supplying a fuel-air mixture to an engine, an air-intake conduit having Venturi means therein, a fuel-air regulator including a fuel valve and a movable valve-actuating member operatively connected thereto, air differential pressure chambers on opposite sides of said member, a passage arranged to communicate conduit pressure to one of said chambers and another passage arranged to communicate Venturi suction to the other of said chambers, flow orifices arranged in series in one of said passages, a pair of valves coacting with said orifices for regulating the differential pressure across said member, flow restricting means coacting with said orifices and becoming increasingly effective as said orifices are progressively reduced in effective flow capacity, a pressure-responsive element operatively connected to one of said latter valves and a temperature-responsive element operatively connected to the other, said elements and valves controlled thereby being independently operable but coacting with one another to regulate the differential in relation to changes in density of the ambient air irrespective of whether such changes are in the pressure component, the temperature component or both components.

2. In a device for supplying a fuel-air mixture to an aircraft engine, an air intake conduit or scoop having a main venturi and a boost venturi therein, a fuel-air regulator including a fuel valve and a movable valve-operating member operatively connected thereto, air pressure chambers in operative communication with said member, a passage communicating scoop pressure with one of said chambers and another passage communicating Venturi suction with the other of said chambers, means for regulating the effective differential pressure across said member in accordance with air density including a passage intercommunicating said scoop pressure and Venturi suction passages having a pair of flow orifices and coacting valves therein, flow restricting means coacting with said orifices and becoming increasingly effective as said orifices are progressively reduced in effective flow capacity, a pressure-responsive element operatively connected to one of said latter valves and a temperature-responsive element operatively connected to the other, said elements and valves being independently operable but coacting in their flow controlling functions.

3. In a device for supplying a fuel-air mixture to an air craft engine, an air intake conduit or scoop having a carburetor inlet therein provided with a main venturi and a boost venturi, a fuel-air regulator including a fuel valve and a movable valve-operating member operatively connected thereto, air pressure chambers in operative communication with said member, a passage communicating scoop pressure with one of said chambers and another passage communicating Venturi suction with the other of said chambers, means for regulating the effective differential pressure across said member in accordance with air density including a passage intercommunicating said scoop pressure and Venturi suction passages and having a pair of flow orifices arranged in series therein and valves coacting with said orifices, flow restricting means coacting with said orifices and becoming increasingly effective as said orifices are progressively reduced in effective flow capacity, a pressure-responsive element operatively connected to one of said valves and a temperature-responsive element operatively connected to the other, said elements and valves being independently operable but coacting in their flow controlling functions.

4. In a device for supplying a fuel-air mixture to an aircraft engine, an air intake conduit or scoop having a carburetor inlet therein provided with a main venturi and a boost venturi, a fuel-air regulator including a metering valve and a movable valve-actuating member operatively connected thereto, air pressure chambers in operative communication with said member, a passage communicating scoop pressure with one of said chambers and another passage communicating Venturi suction with the other of said chambers; means for regulating the effective differential pressure across said member in accordance with air density including a restricted passage intercommunicating said scoop pressure passage and Venturi suction passage, said scoop pressure passage having a pair of flow orifices located in series therein and valve coacting with said orifices, a pressure-responsive element operatively connected to one of said latter valves and a temperature-responsive element operatively connected to the other, said elements and valves being independently operable but coacting in their control of flow through said orifices.

5. In a device for supplying a fuel-air mixture to an aircraft engine, an air intake conduit or scoop having a carburetor inlet provided with a main venturi and a boost venturi, a fuel-air regulator including a metering valve and a movable valve-operating member operatively connected thereto, air pressure chambers in operative communication with said members, a passage communicating scoop pressure with one of said chambers and another passage communicating Venturi suction with the other of said chambers; means for regulating the effective differential pressure across said member in accordance with air density including passage having a restriction therein interconnecting said first-named passages, a pair of flow orifices arranged in the scoop pressure passage and provided with valves, one of said latter valves having a pressure-responsive element operatively connected thereto and the other of said latter valves having a temperature-responsive element operatively connected thereto, the arrangement being such that when the pressure controlled orifice has a relatively large flow area, unit change in temperature will have a total effect on the temperature controlled orifice of greater magnitude than when the pressure controlled orifice is of reduced area.

FRANK C. MOCK.

REFERENCES CITED

The following references are of record in the file of this patent:

UNITED STATES PATENTS

| Number | Name | Date |
| --- | --- | --- |
| 2,224,472 | Chandler | Dec. 10, 1940 |
| 2,264,347 | Udale | Dec. 2, 1941 |
| 2,330,650 | Weiche | Sept. 28, 1943 |
| 2,341,257 | Wunsch | Feb. 8, 1944 |
| 2,361,227 | Mock | Oct. 24, 1944 |

FOREIGN PATENTS

| Number | Country | Date |
| --- | --- | --- |
| 135,557 | Great Britain | Dec. 4, 1919 |
| 523,895 | Great Britain | July 25, 1940 |